April 2, 1957 G. F. COUCH 2,787,226
RAILWAY CAR TRUCK
Filed May 21, 1951 2 Sheets-Sheet 1
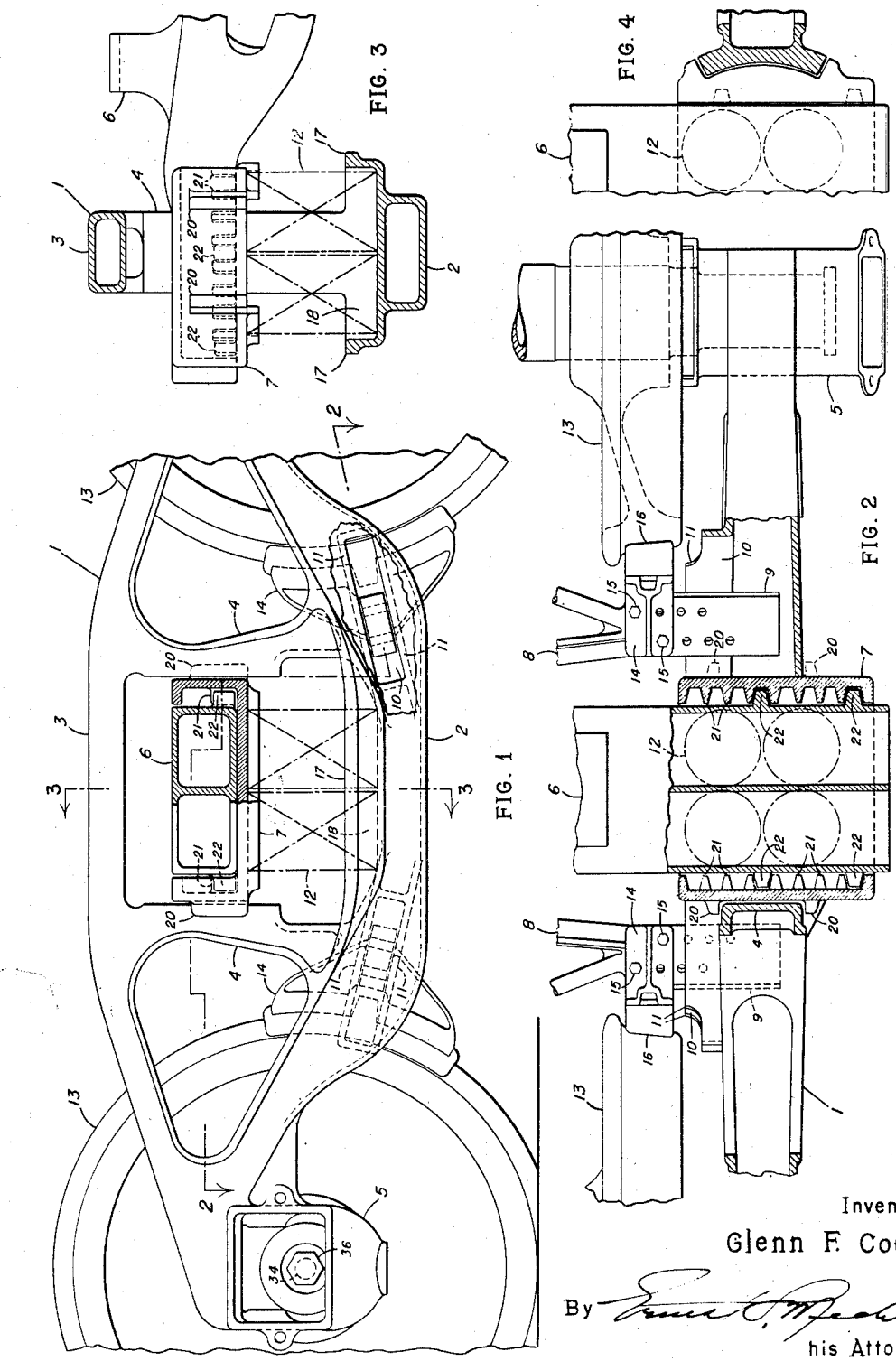
Inventor:
Glenn F. Couch
By [signature]
his Attorney April 2, 1957
G. F. COUCH
2,787,226
RAILWAY CAR TRUCK
Filed May 21, 1951
2 Sheets-Sheet 2
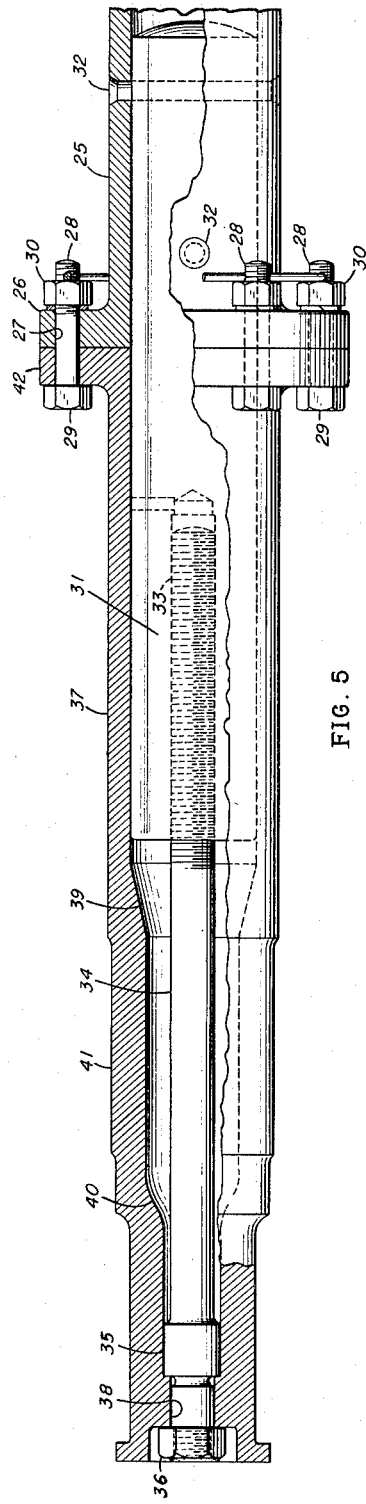
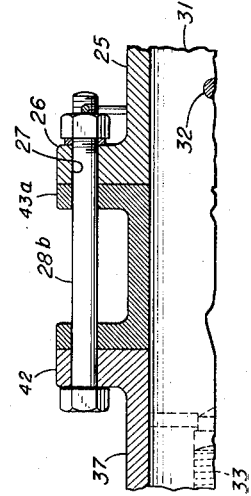
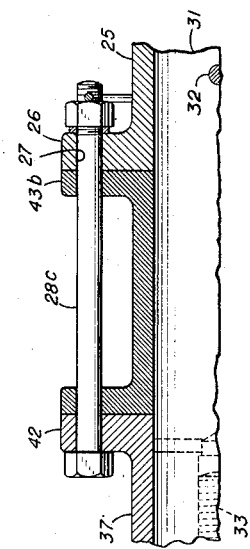
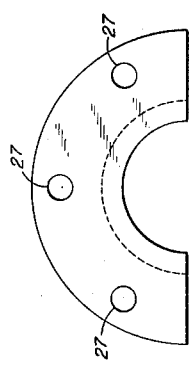
Inventor:
Glenn F. Couch
By
his Attorney

United States Patent Office 2,787,226
Patented Apr. 2, 1957

2,787,226
RAILWAY CAR TRUCK

Glenn F. Couch, Williamsville, N. Y., assignor to The Symington-Gould Corporation, Depew, N. Y., a corporation of Maryland Application May 21, 1951, Serial No. 227,393

16 Claims. (Cl. 105—178)

This invention, broadly considered, relates to trucks for railway cars and more particularly to trucks for adapting the car for use on tracks of any of the four standard gauges, namely 56½", 60", 63" and 66".

The primary object of the invention is to provide a car truck having adjustable axles and bolster to side frame connections for selectively adjusting the truck for use on tracks of any of a plurality of gauges.

An additional object of the invention is to provide a car axle consisting of a plurality of parts which is also adapted to be extended or contracted to accommodate wheels carried by said axle to any one of the above named gauges.

Another object of the invention is to provide a side frame and bolster connection which will enable the side frame and bolster to be adjusted without loss of strength or relationship to accommodate the various lengths of axle necessary to adapt the truck to the gauges mentioned.

The invention further comprises various mechanical details and arrangements so as to permit the rapid adjustment without detriment to strength, rigidity or riding qualities of the truck and its accompanying car.

Other features of the invention and advantages thereof will be hereinafter pointed out in connection with the detailed disclosure of the accompanying drawings, in which:

Figure 1 is a side elevation of a side frame, bolster and associated parts of my improved car truck, portions of the view being broken away and in section for clarification.

Figure 2 is a top plan view partially in section, the section being taken in lines 2—2 of Figure 1.

Figure 3 is a transverse vertical sectional view, the bolster being illustrated in full lines, taken on lines 3—3 of Figure 1.

Figure 4 is a fragmentary sectional view showing the modification of the connection between side frame and bolster to permit radial action when the truck is passing around a curve.

Figure 5 is a view partially in section and partially in elevation of the end of a portion of the middle section of the adjustable car axle.

Figure 6 is a fragmentary view showing the extension of one side of the axle to meet the 60" track gauge.

Figure 7 is a corresponding view showing the axle extended to meet the 63" gauge.

Figure 8 is a similar view showing the axle extended to accommodate a 66" gauge; and Figure 9 is an elevational view of the spacing member illustrated in section in Figures 6, 7 and 8.

Throughout the specification and drawings like parts are designated by like reference characters.

Before describing the invention in detail, it is believed it will lead to a better understanding of the invention to point out that while the track gauge of the main line tracks in the United States, Canada and Mexico is 4'8½", various European tracks are provided with different gauges so as to prevent, in the event of war, the use of cars and locomotives of one country over tracks of another country. Heretofore it has been customary to provide bolsters, brake beams and car axles having the standard wheels connected thereto stocked at points adjacent the various borders so that the trucks can be dismantled and new bolsters, new car axles and new brake beams supplied so that the cars could be changed over from one gauge to the track gauge of the adjacent country.

As I have previously pointed out, my invention relates to a car truck which, except for the extension members hereinafter described and the bolts of different lengths, can be readily changed from one gauge to another without dismantling the truck and without detriment to the riding qualities or strength.

Referring now to the drawings, the numeral 1 indicates one of the side frames of my improved truck having a tension member 2, a compression member 3, bolster guide columns 4, journal boxes 5, a bolster 6, a bolster extension plate, supporting member or cradle 7, and brake beams 8, the brake beams being illustrated as of the unit type having extension plates 9 entering slots 10 in each side frame 1 and being guided by the flanges 11 surrounding the marginal edges of the slots 10. A bolster is supported by the usual nest of springs 12 and fragments of the wheels 13 are shown. The brake beams are provided with members 14 which are bolted to the brake beam by means of the bolts 15, the members 14 carrying the brake shoes 16. The extensions 9 of the brake beam 8 are provided with holes adapted to receive the bolts 15 so as to permit the adjustment of the brake shoes corresponding to the different gauges for which the truck is designed. The tension member 2 of each side frame is provided with flanges 17 so that the springs 12 are, in fact, housed at their lower ends in the recess or pocket 18 formed by the flanges 17 at the central portion of the side frame.

The extension members 7 which are interposed between the side walls of the bolster and the column 4 of the side frame are provided on their outer faces with a projection 20 positioned on opposite sides of the vertical faces of the truck column to limit the inward and outward movement of the pieces 7. They are also provided on their inner faces with a series of upstanding teeth, projections or ribs 21 which are adapted to lie on opposite sides of the outwardly projecting teeth 22 formed on the bolster side walls. Preferably, each side wall of the bolster end is provided with a pair of spaced teeth 22, the spacing between the teeth of each pair being such that there are three recesses, grooves or slots in each plate 7 between the adjacent side walls of the respective bolster teeth 22. The teeth 21 and 22 are preferably slightly less than one-half of the vertical height of the recess 23 in each member 7 and since the inner end of the members 7 are open above the teeth 21 it will be obvious that as the bolster 6 is jacked up so that the lower edges of the teeth 22 will be above the upper face of the teeth 21 the side frame may be quickly and easily detached from the car axles and the bolster and brake beams without dismantling the truck parts or disconnecting any other parts of the truck.

While the side frames, bolster and brake beam construction permit the side frames to be moved from the position shown in Figure 2 to any one of the three other positions illustrated in Figures 6, 7 and 8 by the simple expedient of lifting the bolster and moving the side frames outwardly until the teeth 22 of the bolster register with the appropriate slots or recesses between the teeth 21 on the plates 7, it is obvious that such arrangement would be impractical and of no value unless means were provided for extending the car axles and increasing the distance between the car wheels attached thereto correspondingly to the movement of the side frames. This extension of the car axle is accomplished in the following manner through the hereinafter described instrumentalities.

Each car axle is provided with a central portion 25 having at one end flanges 26 having a series of holes 27 formed therein for the reception of threaded bolts 28 having heads 29 and nuts 30. Riveted or otherwise secured to the portion 25 of the car axle is a solid member 31 which preferably extends a greater distance beyond the flange 26 than it does inwardly of the flange. This member, as I have stated, is secured, preferably by rivets 32, to the member 25 and hence is immovable with respect thereto. It is provided centrally with a threaded opening 33 in which is threadedly mounted a bolt 34 having adjacent its outer end a collar 35 and a nut 36 which is welded or otherwise fixedly secured to the bolt 34. The housing 37 extends around the member 31 and the bolt 34 and forms an axle extension member. This member is provided internally with a shoulder 38 which engages the outer vertical face of the enlarged portion 35 of the bolt 34 and engages the inner vertical face of the nut 36. The axle extension or housing 37 may be provided with tapered portions 39 and 40 in its interior to permit the reduction in diameter of this extension, and is further provided with a slightly tapered portion 41 to which the car wheel 13 is rigidly connected by being pressed on this portion 41.

It is believed obvious that upon the rotation of the bolt 34 in a counterclockwise direction after the bolts 28 are removed, the axle extension 37 will slide on the member 31 so as to space the flange 26 of the member 25 and the flange 42 of the member 37. If this movement is continued for a space of 3½" the collared spacer member 43 shown in Figure 6 can be inserted between the flanges 26 and 42 and the bolts 28a inserted through the holes in the member 43 and the flanges 26 and 42. Since the overall length of the axle has been increased by the width of the member 43, the distance between the car wheels will have been increased 3½" so that the axle and its associated wheels will now track on a 60" gauge railroad track. If the gauge of the track is increased from 60" to 63", then by inserting the 6½" spacer or collar 43a of Figure 7, the distance between the wheels has now been increased so as to position the wheels in alignment with a 63" gauge track. The disclosure of Figure 8 shows the gauge of the axle increased by 9½" over Figure 5 so that the truck will now ride on a 66" gauge track.

It is only necessary, therefore, to carry in the car three sizes of the fillers 43, 43a and 43b and three different lengths of bolts 28a, 28b and 28c, to enable the trucks to track with four different widths of track gauge.

It is to be noted that the outward extension of the member 31 within the hollow axle extension 37 is of sufficient extent to give an extended bearing on both sides of the flanges 26 and 42, irrespective of the gauge of the track with which the axle is cooperating. The collars 43, 43a and 43b are symmetrical and the bolts used to connect the flanges 26 and 42 passing through the respective collars are symmetrically balanced so that there is no eccentric loading on the axle to cause vibration in the car or underframe. It is also observed that the rotation of the bolt 34 in a clockwise direction will cause a shortening of the axle and that by causing the bolt 34 to be moved in one direction or the other after the bolts 28, 28a, 28b and 28c are tightened up, all possibility of play is eliminated.

Having now described my invention and a mode of its application, though it is to be understood that while I have referred to standard gauges, namely 56½", 60", 63" and 66", the same principle would apply in connection with both trucks and axles adapted for use with the so-called narrow gauge tracks which vary in gauge from 37" to 45"; the increments by which one gauge varies from another are, so far as I am aware, uniform so that the arrangement disclosed in the drawings and described in the specification would apply equally to narrow gauge as well as standard gauge trucks.

Having described my invention, what I claim and desire to secure by Letters Patent is:

1. In a car truck, the combination with a bolster member of a side frame member cooperating therewith, said bolster member being shiftable transversely of and having an end portion received in said side frame member, and means carried by and shiftable with one of said members and selectively interlocking with a plurality of spaced means carried by and shiftable with said other member on said relative shifting of said members for interlocking said members in a plurality of positions.

2. In a car truck, the combination with a bolster member of a side frame member cooperating therewith, said side frame member receiving an end portion of said bolster member, and means interposed between and spacing portions of said members, said means being shiftable relative to one of said members laterally of said side frame member while maintaining engagement with said other member, and means on said interposed means and on said relative shifting selectively interlockable with means on said one member for interlocking said members in a plurality of positions.

3. In a car truck, the combination with a bolster member of a side frame member cooperating therewith, said bolster member having an end extending between guide columns of said frame member, a member for supporting said bolster end and shiftable relative to one of said side frame and bolster members laterally of said side frame member while maintaining engagement with the other of said side frame and bolster members, and means on one of said relatively shiftable members and selectively interlocking with a plurality of said frame members, and means shiftable with and projecting laterally from one of said members and selectively engageable with a plurality of spaced means shiftable with said other member on said relative shifting of said members for interlockingly connecting said bolster and side frame members in any of a plurality of positions.

4. In a car truck, the combination with a bolster member of a side frame member cooperating therewith, said bolster member being shiftable transversely of and having an end portion received in an opening in spaced means on the other of said relatively shiftable members on relative shifting thereof for interlockingly engaging said side frame and bolster members in any one of a plurality of positions.

5. In a car truck, the combination with a bolster member of a side frame member cooperating therewith, said bolster member being shiftable transversely of and having an end received in an opening in said frame member, and means shiftable with and projecting laterally from one of said members and selectively engageable with a plurality of spaced means shiftable with said other member on shifting of said bolster member transversely of said frame member for releasably interlocking said bolster and side frame members in any of a plurality of positions.

6. In a railway car truck the combination with side frames of axles connecting said frames, said axles each including a hollow exterior portion formed of two axially aligned parts, means fixed to one of and bridging said parts, screw means in and rotatable independently of said other part, said screw means threadedly engaging said fixed means for adjusting the spacing between said parts, and means insertible between the parts of each of said axles and rigidly securable thereto for fixing said axles at a predetermined overall length.

7. In a railway car truck the combination with side frames of axles connecting said frames, said axles each being formed of a plurality of axially aligned parts, means for adjusting the spacing between said parts and means adapted to be inserted between said parts and removably secured thereto for maintaining the said axle at a predetermined length.

8. In a railway car truck the combination with side frames of axles connecting said frames, said axles each having a two-part hollow exterior portion, a rigid interior portion bridging the intersection of the parts of said outer portion, means extending into said interior portion for moving the parts of said exterior portion relative to each other, and means adapted to be inserted between said parts of said axles to maintain the overall length thereof at a predetermined distance.

9. In a railway car truck, an axle having a hollow exterior portion formed of a plurality of parts, means in said portion for adjusting the spacing of the parts thereof, and means adapted to be inserted between and removably secured to said parts for fixing said adjusted spacing and maintaining said axle at a predetermined length.

10. In a railway car truck, an axle having a hollow exterior portion formed of a plurality of axially aligned parts, means in and adjustable through an end of said axle for adjusting the spacing between said parts, and means insertible between said parts and removably securable thereto for fixing said adjusted spacing and maintaining said axle at a predetermined length.

11. In a railway car truck, an axle having a hollow exterior portion formed of a plurality of axially aligned parts, core means in said axle, said core means being fixed to one and slidably engaging another of said parts, and screw means connected to said other part and threadedly engaging said core means for adjusting the spacing between said parts.

12. In a railway car truck, the combination with a bolster member and a side frame member of tooth means carried by and projecting from one of said members laterally of said bolster member, and a plurality of grooves carried by said other member and spaced longitudinally of said bolster member, said tooth means being selectively seatable in said grooves on shifting of said bolster member transversely of said frame member for interlocking said members in any of a plurality of positions.

13. In a railway car truck, the combination with a bolster member and a side frame member of a support member interposed between and spacing said bolster and frame members and supporting said bolster member, tooth means carried by one of said members and projecting laterally of said bolster, and a plurality of grooves carried by another of said members and spaced longitudinally of said bolster, said tooth means being selectively receivable in said grooves on shifting of said bolster member transversely of said frame member for interlocking said bolster and frame members in any of a plurality of positions.

14. In a railway car truck, the combination of a side frame member, a bolster member shiftable transversely relative to said side frame member, means shiftable with said side frame member for selectively interlocking with means shiftable with said bolster member for interlocking said members in any of a plurality of positions on relative transverse shifting of said members, an axle connected to said side frame, and means for varying the length of said axle to correspond to the selected relative position of said bolster and frame members.

15. In a railway car truck, the combination of a pair of spaced side frame members, a bolster member shiftable transversely of said side frame members, and a pair of axles connecting said side frame members, means for varying the length of said axles for adjusting the spacing between said frame members, and means shiftable with said frame members and selectively engageable with spaced means shiftable with said bolster member on transverse shifting of said bolster member relative to said frame members for selectively interlocking said members at any of a plurality of positions corresponding with the adjusted spacing of said frame members.

16. In a railway car truck, the combination of a pair of spaced side frame members, a bolster member and a pair of axles connecting said side frame members, each of said axles having a hollow portion formed of a plurality of axially aligned parts, means for adjusting the spacing between said parts, means insertible between said parts for fixing said adjusted spacing to maintain a predetermined overall length of said axles, and means for selectively interlocking said bolster member with each of said frame members in any of a plurality of positions in correspondence with the overall length of said axles, said last named means comprising tooth means carried by and projecting laterally from one of said members and a plurality of grooves carried by said other member, and spaced longitudinally of said bolster member for selectively receiving said tooth means.

References Cited in the file of this patent

UNITED STATES PATENTS

| 867,999 | Norwick | Oct. 15, 1907 |
| 1,315,672 | Kleinschmidt | Sept. 9, 1919 |
| 1,793,574 | Whitridge et al. | Feb. 24, 1931 |
| 2,457,182 | Schrock | Dec. 28, 1948 |
| 2,598,831 | Ramey | June 3, 1952 |

FOREIGN PATENTS

| 692 of 1852 | Great Britain | Nov. 9, 1852 |
| 4,481 | Great Britain | Mar. 2, 1895 |
| 397,235 | France | Feb. 18, 1909 |
| 661,845 | France | Mar. 11, 1929 |